United States Patent [19]

Hurst

[11] 4,122,734

[45] Oct. 31, 1978

[54] LABEL STRIPPING MACHINE

[76] Inventor: Richard F. Hurst, Childrens Farm/King Rd., Malvern, Pa. 19355

[21] Appl. No.: 725,252

[22] Filed: Sep. 21, 1976

[51] Int. Cl.$^2$ .......... B23B 3/00

[52] U.S. Cl. .......... 82/1 C; 82/2 D; 82/6 R

[58] Field of Search .......... 15/93 R; 82/1 R, 1 C, 82/6 R, 6 A, 2 D, 97; 156/344, 58.4

[56] References Cited

U.S. PATENT DOCUMENTS

| | | | |
|---|---|---|---|
| 553,997 | 2/1896 | Mueller | 15/93 R |
| 606,157 | 6/1898 | Mueller | 15/93 R |
| 1,350,840 | 8/1920 | Robbins | 82/2 D X |
| 1,845,478 | 2/1932 | Bullard, Jr. | 82/2 D X |
| 1,863,338 | 6/1932 | Hoffman | 15/93 R |
| 1,871,678 | 8/1932 | Ermold | 15/93 R |
| 3,153,436 | 10/1964 | Chesley | 82/1 R |

FOREIGN PATENT DOCUMENTS

| | | | |
|---|---|---|---|
| 660,786 | 6/1938 | Fed. Rep. of Germany | 82/2 D |

*Primary Examiner*—J. M. Meistes
*Attorney, Agent, or Firm*—John B. Sowell

[57] ABSTRACT

A semi-automatic Label Stripping Machine for detaching labels from round containers in which a labeled container is placed on a container receiver platform means, a spring loaded stabilizing top roller means is brought down overtop and abuting the container, the container is rotated on its central vertical axis by a rotary drive means operably connected to said container receiving platform means, and, while said container is rotated, a razor means, operably connected to a vertical drive means, moves down the outside circumferal labeled wall of the container, spirally cutting off the label from the container.

9 Claims, 4 Drawing Figures

LABEL STRIPPING MACHINE

BACKGROUND OF THE INVENTION

1. Field of the Invention

The present invention relates to a semi-automatic Label Stripping Machine to remove attached labels from round containers, including, but not limited to, bottles, vials, syringes, ampuls, and the like.

2. Description of the Prior Art

Product identification by use of preprinted labels is an economical, efficient, and growing trend. A percentage of labels, however, are defective because of improper legend, illegibility, faulty label material, faulty label attachment, and so forth.

Frequently, the cost of the contained material, the cost of the container, or cost of closure, or all, urge relabeling of the container. Naturally, the original defection must be removed.

The standard method of label removal is with hand-held razor. This practise is time consuming and dangerous. The present invention increases the speed of label stripping and affords safety to the operator.

SUMMARY OF THE INVENTION

The present invention essentially consists of a Label Stripping Machine in which a container is spun while a razor means decends the container wall, lathing off the attached label. In particular, the spinning motion of the container is achieved by means of a rotary drive means operably connected to a container receiving platform means. The container is held firmly in place on the platform means by means of a spring loaded abuting top roller means. A razor means, mounted to a razor bracket means at a suitable angle, abuting the wall of the container, and spring loaded toward the container, is caused to decend the wall of the container by means of a vertical drive means, spirally cutting off the label from the container.

After the label has been removed, the razor means is returned to its uppermost position, and the delabeled container is removed.

The Label Stripping Machine of the present invention is small in size, portable, reliable, quiet, open essentially on three sides for easy access, economical, easy to operate and safe.

A feature and object of the present invention resides in the flexability of the Label Stripping Machine of the present invention to accomodate various sizes of round containers by simple adjustment and/or interchange of a few parts.

A feature and object of the present invention resides in the flexability of the Label Stripping Machine of the present invention to be constructed with one or a plurality of container receiving platform means, spring loaded stabilizing top roller means, and razor means, to accomodate a plurality of containers in accord with particular production needs.

A further feature and object of the present invention resides in the ability of the razor means of the Label Stripping Machine of the present invention, to be located on the razor bracket means at a suitable angle to detach a particular label material, such as plastic, foil, or paper.

Accordingly, it is the object of the present invention to provide a label stripping machine which obviates by simple means the shortcomings and drawbacks of the prior hand method, while providing versatility, safety, and production benefits.

These, and other objects, features, and advantages of the present invention will become more apparent from the following description when taken in connnection with the accompanying drawing which shows, for purposes of illustration only, one embodiment of a Label Stripping Machine in accordance with the Label Stripping Machine of the present invention, and wherein.

Referring now to the drawing wherein like reference numerals are used throughout the various views to designate like parts, a Label Stripping Machine in accord with the Label Stripping Machine of the Present Invention, includes.

DESCRIPTION OF A PREFERRED EMBODIMENT

Figure 1:
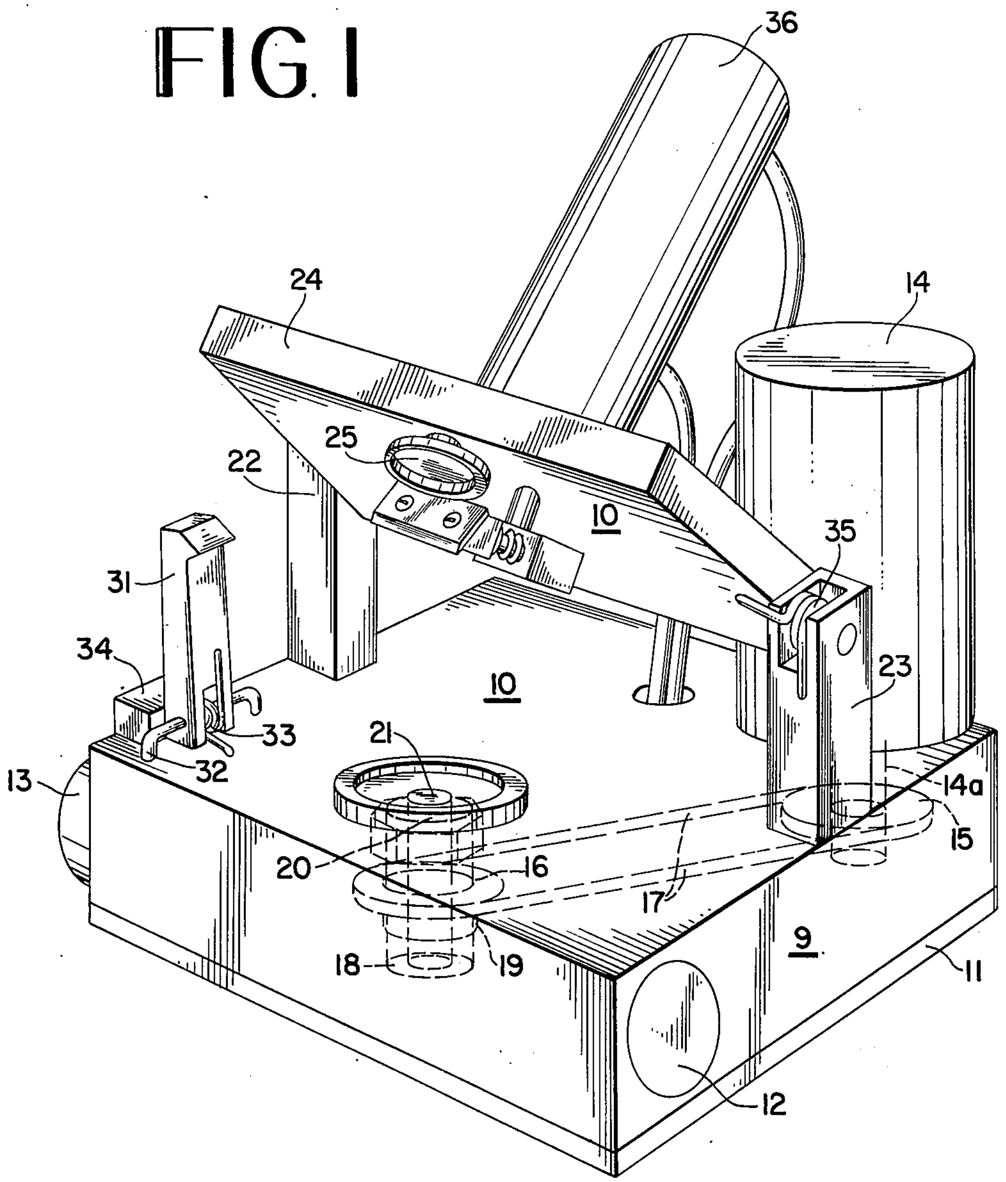
FIG. 1 is a perspective view of a label stripping machine in accord with the Label Stripping Machine of the present invention.

Refer now to FIG. 1 showing a closed housing or base platform 10 comprising base plate 11, sidewalls 9 and a removable top plate 8. Control switches 12 and 13 are preferably mounted in the sidewalls 9 for initiating a label removing operation as will be explained.

Motor 14 mounted on top plate 8 has a shaft **14*a* extending through an aperture (not shown) in top plate 8. Drive sprocket or pulley 15 on shaft 14*a* drive driven sprocket or pulley 16 through chain or belt 17**.

Figure 2:
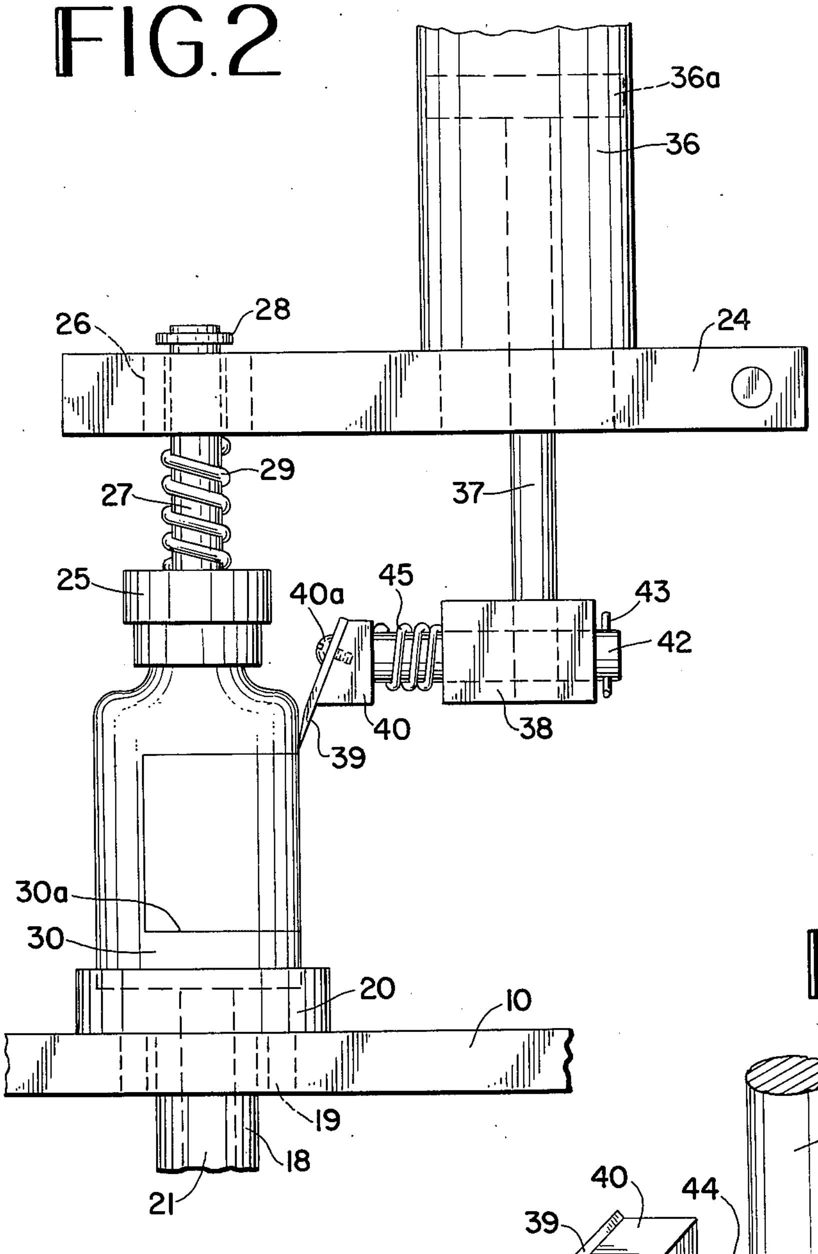
FIG. 2 is a sectional view of a label stripping machine in accord with the Label Stripping Machine of the present invention including a view of a Positioned Container 30.

As shown in FIGS. 1 and 2 driven sprocket 16 is connected to hollow shaft 18 supported in bearing 19 mounted in top plate 8 of housing 10. When motor 14 drives shaft **14*a*, hollow shaft 18 drives saucer shaped container receiving platform 20. Aperture 21 in shaft 18 is adapted to receive small hypodermic needles or extensions of vial type containers. It will be understood that the shape of platform 20** is adapted to center several shapes of containers before a different shape platform need be substituted therefor.

As shown in FIGS. 1 and 2, pedestal brackets 22 and 23 pivotally supported plate 24. When plate 24 is closed or in the operating position, top roller 25 is axially aligned with platform 20 and adapted to urge container 30 into frictional engagement with concave platform 20. Bearing 26 in support plate 24 is adapted to receive slidably mounted shaft 27 which is connected to top roller 25. Centering top roller 25 is spring urged by spring 29 to engage the top of container 30. Retaining ring 28 prevents spring 29 from urging shaft 27 out of bearing 26.

When pivotally supported plate 24 is moved to the down or latched position against the force of spring 35, latch 31 is pivoted open or outwardly on its pivot bracket 32. Spring 33 normally holds latch 31 inwardly, but when pivoted outwardly closes the contacts of switch means 34 actuating rotary drive motor 14 as will be explained in greater detail hereinafter.

Figure 3:
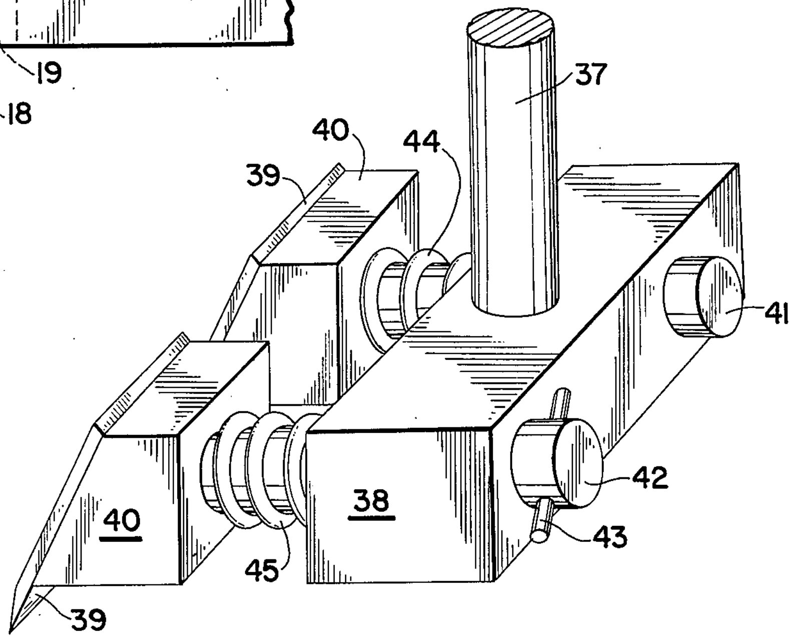
FIG. 3 is a sectional view of a label stripping machine in accord with the Label Stripping Machine of the present invention.

Presumably a container 30, or containers like 30, are now clamped and centered between platform (s) and top roller (s) 25, and labels 30*a* may be removed by the blade assemblies shown in FIGS. 2 and 3.

Pneumatic cylinder 36 having a two way piston 36*a* is a preferred means of actuating the blade assembly. Blade rod retaining bracket 38 is shown mounted on piston shaft 37. When pressure is applied to the top of piston 36*a*, shaft 37 moves downward. When pressure is applied to the bottom of piston 36*a* shaft 37 moves upward. The limits of excursion of shaft 37 may be controlled by means not shown.

Elongated rod bracket 38 is shown connected to vertically movable shaft 37. Horizontally movable rods 41, 42 are slidably mounted in rod bracket 38 and their outward excursion is limited by guide pins 43. Springs 44, 45 mounted around rods 41, 42 urge blade brackets 40, supporting blade means 39 thereon, away from bracket 38 and into engagement with the outer surface of irregular cylindrical shaped container 30. It will be understood that most inexpensive glass containers are blown, drawn or molded so that their outer surfaces only approximates a cylindrical surface. Accordingly, blades 39 are independantly mounted on brackets 40 and independantly urged into contact with the outer surface of containers 30. Springs 44, 45 serve to frictionally hold blade brackets 40 in the position where they are set, however, blades 39 may be mounted on brackets 40 at a slight angle to allow the angle of the blade to be adjusted for an optimum cut.

Figure 4:
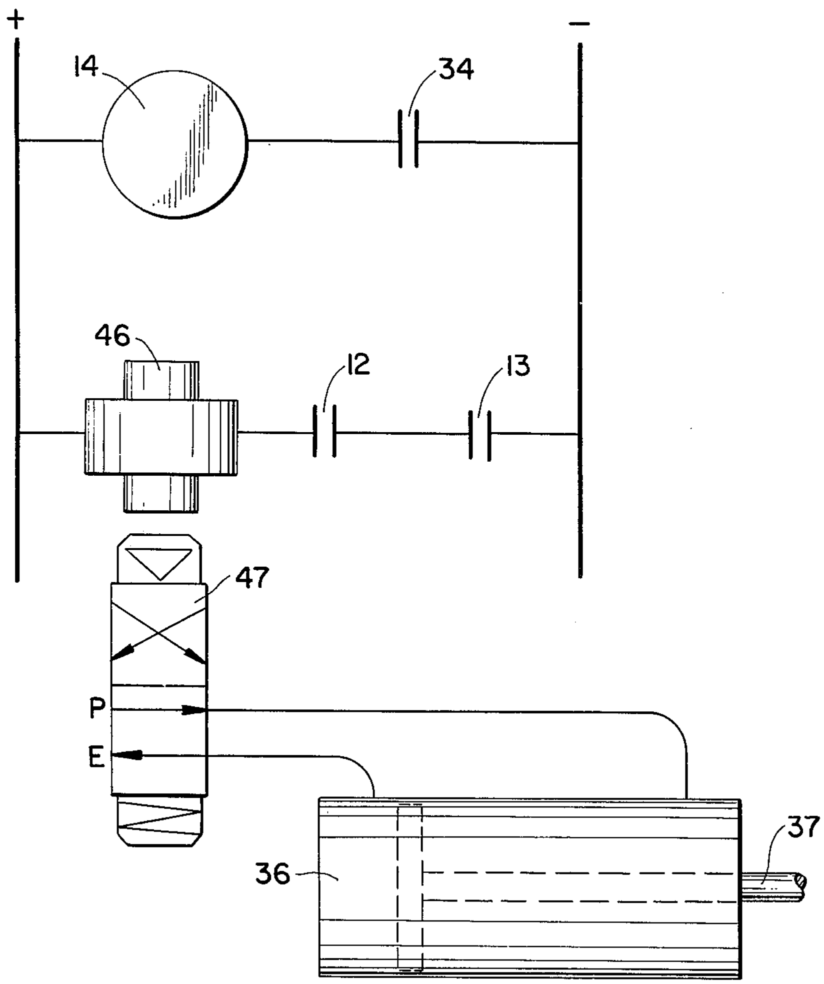
FIG. 4 is a schematic electric wiring and pneumatic routing diagram of a Label Stripping Machine in accord with the Label Stripping Machine of the present invention.

In the preferred embodiment shown, blades 39 are shown as razor blades mounted on brackets 40 by screws 40 *a*. Actuation of pneumatic cylinder 36 moves all blades 39 downwardly simultaneously causing blades 39 each to follow the contour of its associated container 30 and to spirally strip label 30*a* therefrom. Deactivation of cylinder 36 returns piston 36*a*, shaft 37 and rod bracket 38 to the normal or start position shown in FIGS. 1 and 2 when the operator releases safety start buttons 12 and 13. Only one platform 20 has been shown, however, it will be understood that another such rotatable platform 20 and top roller 25 will be provided opposite each blade 39 of the type shown in FIG. 3. A plurality of platforms 20 may be economically loaded and operated by a single operator at a single station. A preferred simplified control is shown schematically in FIG. 4 of the type adapted to control one or more rotatable platforms at a single station.

IN OPERATION

Operator places labeled container 30 on container receiving platform 20. Operator moves plate 24 down to a plane position parallel to that of the top of housing 10. Spring stabilizing roller 25 is thus brought to a position overtop and abuting container 30. Latch 31 is moved overtop of the edge of plate 24 causing plate 24 to be held in continuing parallel position, and causing switch 34 to activate motor 14, thereby causing container 30 to spin. As plate 24 is positioned, razor 39 is shifted to a position abuting the container's circumferal wall atop the labeled area. Buttons 12 and 13, series connected for safety, are actuated by operator energising solonoid 46. Solonoid 46 shifts commercially available air valve 47 to divert air from the bottom of air cylinder 36 to the top of air cylinder 36, forcing air cylinder shaft 37 down. Air cylinder shaft 37 is operably connected to razor rod bracket 38. Razor 39, connected to razor bracket 40, which, in turn, is at least partially supported within razor rod bracket 38 by means of rods 41 and 42, is pushed by means of springs 44 and 45 into contact with the container wall, and caused to decend the container wall by means of said air cylinder shaft 37. Thus a label attached to container 30 wall is cut off spirally. Release of buttons 12 and 13 cause air valve 47 to be returned to normal position, causing air to divert again to the bottom of air cylinder 36, and withdrawing razor 39 to its uppermost position. Operator then shifts latch 31 to a position off of plate 24 causing switch 34 to stop motor 14. Spring 35 urges plate 24 to an up position allowing easy removal of delabeled container 30.

I claim:

1. A label stripping machine for cutting labels from the outside wall of irregular cylindrical shaped containers comprising:

- a base housing,
- rotary platform means mounted on said housing for receiving one end of said cylindrical shaped container,
- stablizing guide means mounted on said housing and adapted to rotably clamp the other end of said cylindrical shaped container,
- drive means mounted on said housing and operably connected to said rotary platform means,
- blade bracket means movably supported on said housing for movement parallel to the outer wall of said irregular cylindrical shaped container,
- blade means mounted on said blade bracket, and
- blade bracket actuating means for moving said blade means into contact with said labels along said outside wall of said irregular cylindrical shaped container to spirally cut said label from said container.

2. A label stripping machine as set forth in claim 1 wherein said blade bracket means is mounted on a rod slidably mounted in a rod retaining bracket,

- said rod retaining bracket being moved by said actuating means for moving said blade means and said blade bracket means parallel to said outside wall of said irregular cylindrical shaped container.

3. A label stripping machine as set forth in claim 2 which further includes spring means for urging said blade means into engagement with said outside wall of said irregular cylindrical shaped container.

4. A label stripping machine as set forth in claim 3 wherein said spring means comprises a compression spring mounted on the outside of said rod intermediate said blade bracket means and said rod retaining bracket.

5. A label stripping machine as set forth in claim 1 wherein said rotary platform means includes a plurality of rotary platforms,

- said stabilizing guide means includes a like plurality of stabilizing guides,
- said blade brackets means includes a plurality of blade brackets each being mounted on a rod slidably mounted in,
- a rod retaining bracket,
- said rod retaining bracket being moved by said actuating means for simultaneously moving said plurality of blade brackets, and
- blade means on each said blade bracket being urged into contact with a label along the outside of the wall of an irregular cylindrical shaped container on a rotary platform.

6. A label stripping machine as set forth in claim 5 which further includes a plurality of springs, each independently urging said blade means into engagement with the outer wall of an irregular cylindrical shaped container.

7. A label stripping machine as set forth in claim 1 wherein said stabilizing guide means are mounted on a plate which is pivotally mounted on said base housing.

8. A label stripping machine as set forth in claim 7 which further includes latch means cooperating with said plate for enabling said drive means when said container is engaged between said rotary platform means and said stabilizing guide means.

9. The method of removing a label from the outside of an irregular shaped cylindrical container comprising the steps of centering said irregular shaped container on a rotatable platform, applying an axial pressure on one end of said container to frictionally engage said container with said rotatable platform, rotating said rotatable platform, simultaneously axially moving a resiliently mounted cutting blade along the outside of said irregular cylindrical shaped container, and urging said resiliently mounted cutting blade into engagement with the outside of irregular shaped container to spirally remove said label attached thereon.

* * * * *